United States Patent
Inoue et al.

(10) Patent No.: US 11,485,466 B2
(45) Date of Patent: Nov. 1, 2022

(54) SHIP MANEUVERING SYSTEM AND SHIP MANEUVERING METHOD

(71) Applicant: YAMAHA HATSUDOKI KABUSHIKI KAISHA, Iwata (JP)

(72) Inventors: Hiroshi Inoue, Shizuoka (JP); Takeshi Ohata, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 274 days.

(21) Appl. No.: 16/893,487

(22) Filed: Jun. 5, 2020

(65) Prior Publication Data
US 2020/0391838 A1 Dec. 17, 2020

(30) Foreign Application Priority Data

Jun. 12, 2019 (JP) .............................. JP2019-109905

(51) Int. Cl.
*B63H 20/12* (2006.01)
*B63H 25/04* (2006.01)
*B63H 20/10* (2006.01)

(52) U.S. Cl.
CPC ............. *B63H 20/12* (2013.01); *B63H 20/10* (2013.01); *B63H 25/04* (2013.01)

(58) Field of Classification Search
CPC ......... B63H 20/12; B63H 20/10; B63H 25/04
See application file for complete search history.

(56) References Cited

U.S. PATENT DOCUMENTS

| 4,926,778 A | * | 5/1990 | Johnston ............... B63B 39/061 114/273 |
| 2005/0092225 A1 | * | 5/2005 | Kaji ...................... B63H 25/42 114/144 R |
| 2008/0167768 A1 | * | 7/2008 | Rubenstein ............ B63B 39/04 701/21 |
| 2017/0255205 A1 | * | 9/2017 | Hashizume .......... G05D 1/0875 |

FOREIGN PATENT DOCUMENTS

| JP | 2009-262588 A | 11/2009 | |
| WO | WO-2016036616 A1 | * 3/2016 | ............... B63B 1/22 |

OTHER PUBLICATIONS

Zipwake, "Operators Manual Dynamic Trim Control System", Retrieved from the Internet http://www.zipwake.com, retrieved on Jun. 3, 2020, 147 pages.

* cited by examiner

*Primary Examiner* — Stephen P Avila
(74) *Attorney, Agent, or Firm* — Keating and Bennett, LLP

(57) ABSTRACT

A ship maneuvering system includes a propulsion unit to steer a ship body, a trim adjuster disposed on the ship body, and a controller. The controller is configured or programmed to correct a change in the traveling state of the ship body due to operation of the trim adjuster.

18 Claims, 10 Drawing Sheets

SHIP MANEUVERING SYSTEM AND SHIP MANEUVERING METHOD

CROSS REFERENCE TO RELATED APPLICATIONS

This application claims the benefit of priority to Japanese Patent Application No. 2019-109905 filed on Jun. 12, 2019. The entire contents of this application are hereby incorporated herein by reference.

BACKGROUND OF THE INVENTION

1. Field of the Invention

The present invention relates to a ship maneuvering system and a ship maneuvering method.

2. Description of the Related Art

The prior art discloses a configuration in which a trim tab is attached to a rear portion of a ship body. For example, in Japanese Patent Application Laid-Open No. 2009-262588 and "http://www.zipwake.com/", the trim adjusting portion (trim tab and interceptor) is attached to the rear portion of the ship body. Specifically, in Japanese Patent Application Laid-Open No. 2009-262588, the trim tab is swingably attached to the rear portion of the ship body. In this case, a lift force is generated on the ship body by swinging the trim tab from the ship body toward the water surface and contacting the trim tab with the water. Further, in "http://www.zipwake.com/", the interceptor is attached to the rear portion of the ship body so as to move forward and backward. In this case, the lift force is generated on the ship body by projecting the interceptor from the lower surface of the ship body in the water. In this way, the attitude of the ship body is changed by generating the lift force on the ship body.

In the prior art, when the trim adjusting portion (trim tab and interceptor) is operated to change the attitude of the ship body, resistance is generated in the trim adjusting portion. For example, when one of the pair of trim tabs or one of the pair of interceptors is activated, the traveling direction of the ship body changes due to the resistance generated on the one trim tab or the one interceptor. In other words, the traveling state of the ship body is changed by operating the trim adjusting portion (trim tab or interceptor).

SUMMARY OF THE INVENTION

Preferred embodiments of the present invention provide ship maneuvering systems and ship maneuvering methods, each of which is able to significantly reduce or prevent changes of a traveling state of a ship due to an operation of a trim adjuster.

A ship maneuvering system according to a preferred embodiment of the present invention includes a propulsion unit to steer a ship body, a trim adjuster disposed on the ship body, and a controller configured or programmed to correct a change of a traveling state of the ship body due to operation of the trim adjuster.

A ship maneuvering method according to another preferred embodiment of the present invention is executed by a controller to maneuver a ship including a propulsion unit to steer a ship body and a trim adjuster disposed on the ship body. The ship maneuvering method includes the following processes to correct a change of a traveling state of the ship body due to operation of the trim adjuster by steering the propulsion unit.

According to preferred embodiments of the present invention, it is possible to significantly reduce or prevent changes of traveling states of ships due to the operation of a trim adjuster in the ship maneuvering systems and the ship maneuvering methods.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
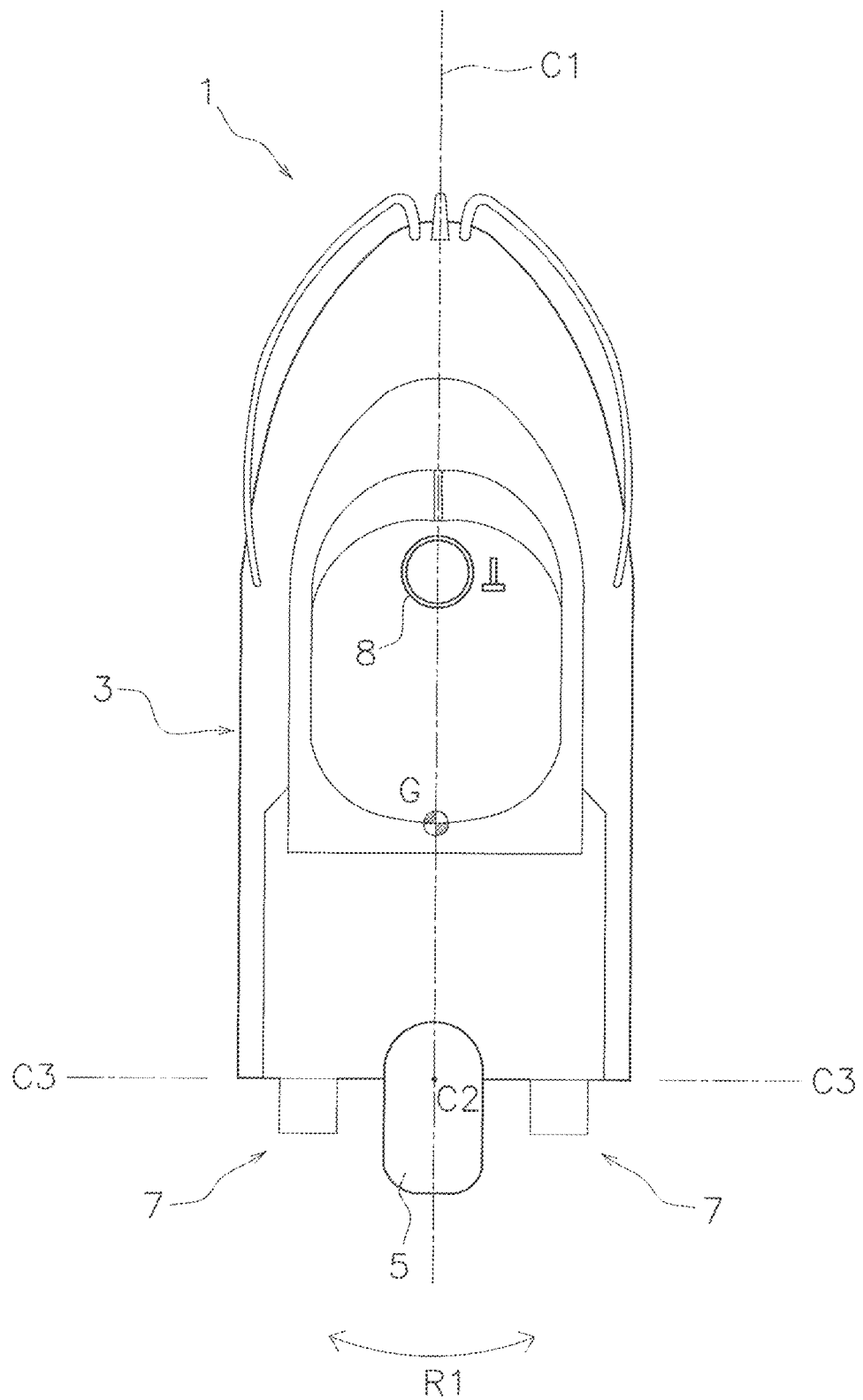
FIG. 1 is a top view which shows a ship according to a preferred embodiment of the present invention.

Hereinafter, the preferred embodiments of the present invention will be described with reference to the drawings. As shown in FIG. 1, the ship 1 includes a ship body 3, a propulsion unit 5, and a plurality (for example, a pair) of trim tabs 7 (an example of a trim adjuster). The ship 1 further includes a steering unit 14 (see FIGS. 2 and 4). The ship 1 further includes a ship maneuvering system 31 (see FIG. 4).

An example in which the number of the propulsion units 5 is one is illustrated, but the number of the propulsion units 5 may be two or more. Further, the number of trim tabs 7 may be three or more.

In the following description, the front, rear, left, right, upper, and lower directions refer to the front, rear, left, right, upper, and lower directions of the ship body 3. For example, as shown in FIG. 1, the centerline C1 extending in the front-rear direction of the ship body 3 passes through the gravity center G of the ship 1. The front-back direction is a direction along the centerline C1. The front is the direction toward the upper side along the centerline C1 in FIG. 1. The rear side is a direction toward the lower side along the centerline C1 in FIG. 1.

The left-right direction (width direction) is a direction perpendicular to the centerline C1 in FIG. 1. The left side is a direction perpendicular to the centerline C1 in FIG. 1. The right side is a direction toward the right side perpendicular to the centerline C1 in FIG. 1. The vertical direction is a direction perpendicular to the front-rear direction and the left-right direction.

Figure 2:
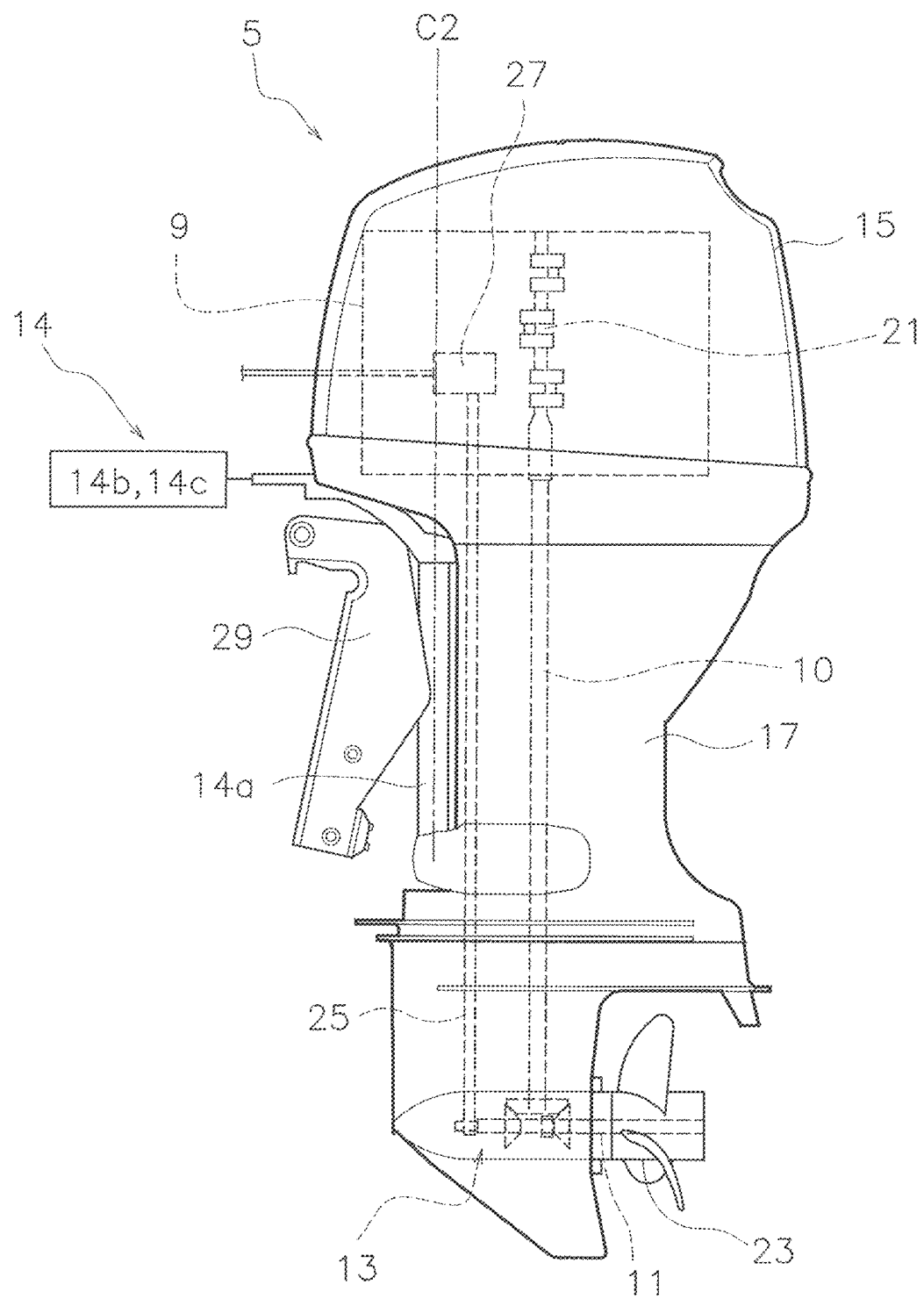
FIG. 2 is a side view of a propulsion device.

As shown in FIG. 2, the propulsion device is, for example, an outboard motor. The propulsion unit 5 generates a propulsive force that propels the ship body 3. The propulsion unit 5 steers the ship body 3. The propulsion unit 5 is attached to the stern of the ship body 3. For example, the propulsion unit 5 is located between the pair of trim tabs 7.

The propulsion unit 5 is attached to the ship body 3 via the bracket 29. For example, the propulsion unit 5 is detachably fixed to the stern of the ship body 3 via the bracket 29 fixed to the ship body 3.

The propulsion unit 5 includes an engine 9, a drive shaft 10, a propeller shaft 11, a shifter 13, an engine cover 15, and a housing 17.

The engine 9 applies the thrust to the ship body 3. The engine 9 is a power source that generates the thrust of the ship body 3. In the present preferred embodiment, an example in which the engine 9 is used as the power source is illustrated, but a motor may be used as the power source. The engine 9 is located in the engine cover 15. The engine 9 includes a crankshaft 21. The crankshaft 21 extends in the vertical direction.

The drive shaft 10 is connected to the crankshaft 21. The drive shaft 10 extends downward from the engine 9. The propeller shaft 11 extends in a direction which intersects with the drive shaft 10. The propeller shaft 11 extends in the front-rear direction. The propeller shaft 11 is connected to the drive shaft 10 via the shifter 13. A propeller 23 is connected to the propeller shaft 11.

The housing 17 is located below the engine cover 15. The housing 17 is attached to the engine cover 15. The drive shaft 10, the propeller shaft 11, and the shifter 13 are located in the housing 17. The shifter 13 is driven by the shift actuator 27 via the shift member 25. The shifter 13 switches the rotation direction of the power that is transmitted from the drive shaft 10 to the propeller shaft 11. Thus, the rotation direction of the propeller 23 is switched to a forward direction or a reverse direction.

In the following, in the state in which the propulsion unit 5 is located in a neutral position as shown in FIG. 1, the propulsion unit 5 rotates in a rotation direction R1 with respect to the rotation axis C2 as a reference. The propulsion unit 5 is rotated by the steering unit 14.

Figure 4:
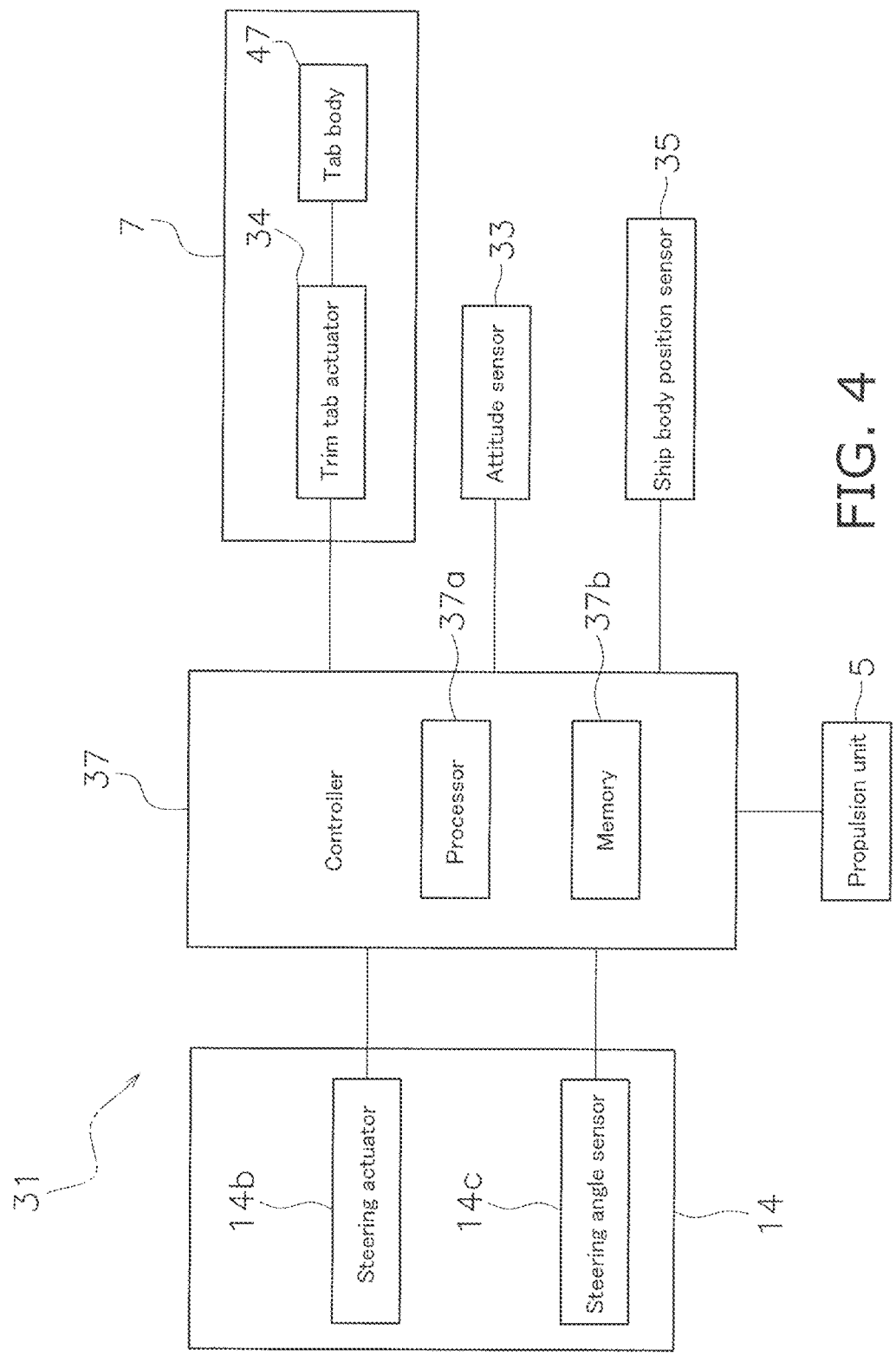
FIG. 4 is a schematic diagram which shows the configuration of a ship maneuvering system.
Figure 5A:
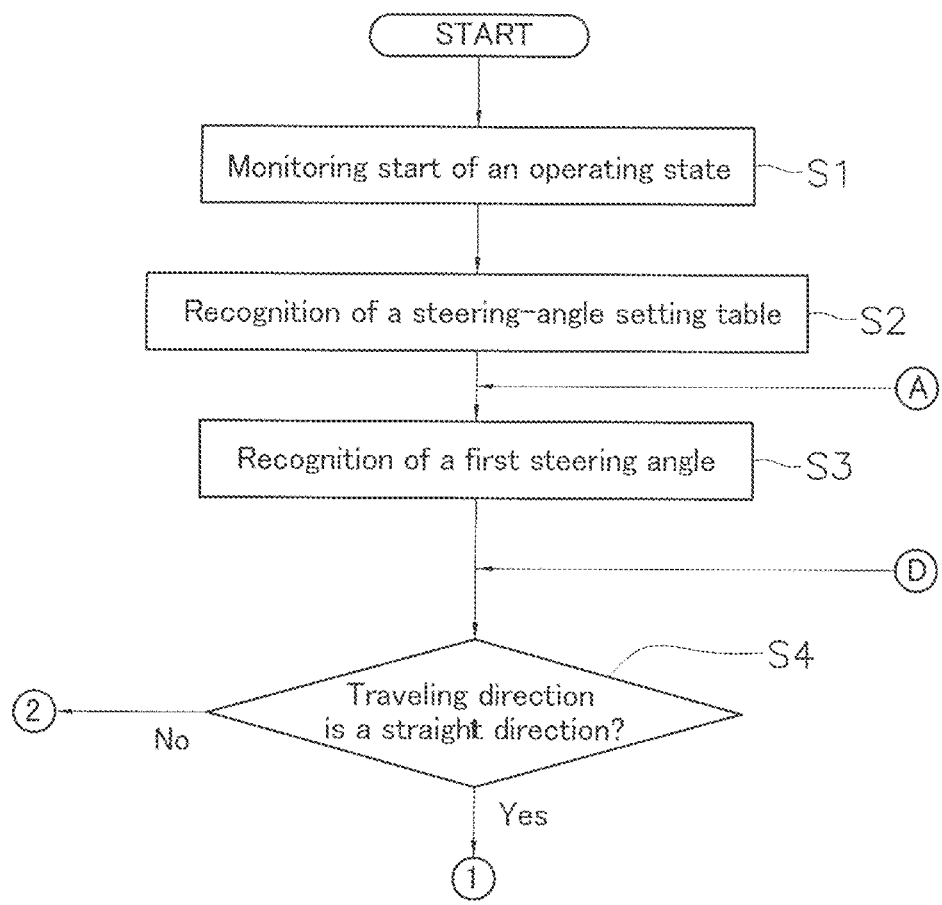
FIG. 5A is a flow chart which shows processes performed by the ship maneuvering system.
Figure 5B:
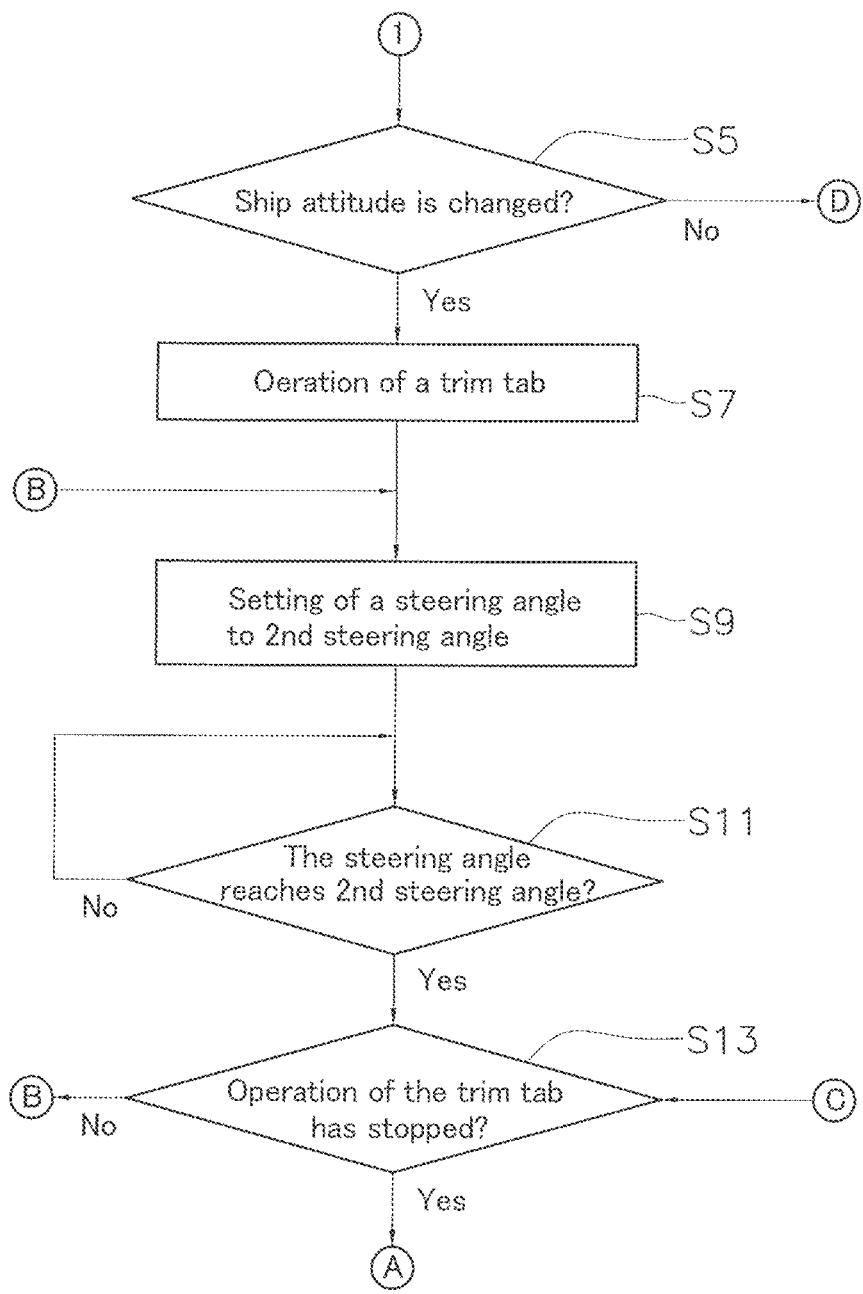
FIG. 5B is a flow chart which shows processes performed by the ship maneuvering system.
Figure 5C:
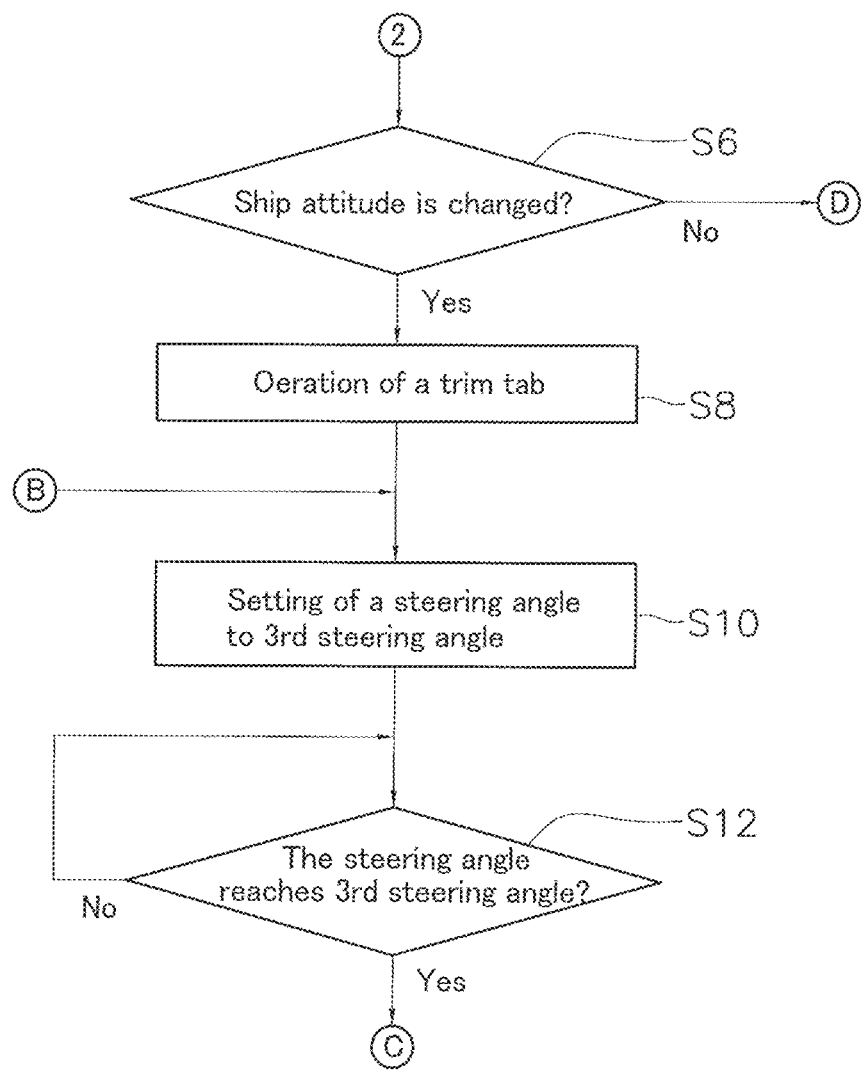
FIG. 5C is a flow chart which shows processes performed by the ship maneuvering system.
Figure 5D:
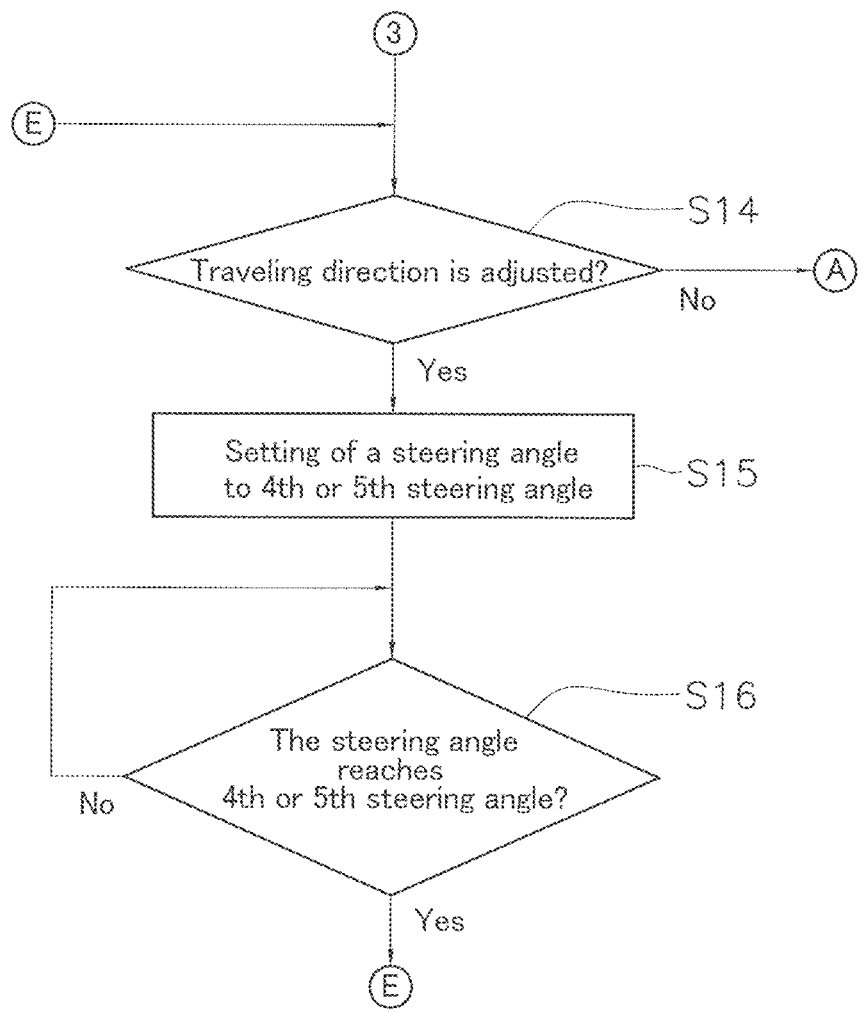
FIG. 5D is a flow chart which shows processes performed by the ship maneuvering system.

The steering unit 14 rotates the propulsion unit 5 with respect to the ship body 3. As shown in FIGS. 2 and 4, the steering unit 14 includes a steering shaft 14a, a steering actuator 14b, and a steering angle sensor 14c.

The steering shaft 14a rotatably supports the propulsion unit 5 with respect to the bracket 29. Specifically, the steering shaft 14a is disposed between the housing 17 and the bracket 29. The steering shaft 14a rotatably supports the housing 17 with respect to the bracket 29 which is fixed to the ship body 3.

The steering actuator 14b rotates the propulsion unit 5 with respect to the ship body 3 via the steering shaft 14a. Specifically, the steering actuator 14b rotates the housing 17 with respect to the bracket 29 around the rotation axis C2 of the steering shaft 14a.

For example, the steering actuator 14b includes the electric motor 102. The steering actuator 14b rotates the housing 17 with respect to the bracket 29 via a hydraulic pump, a hydraulic cylinder, and the like (not illustrated).

The steering angle sensor 14c detects the steering angle of the steering handle 8 (see FIG. 1). For example, the steering handle 8 is rotatably provided on the ship body 3. The steering angle sensor 14c outputs steering angle data indicating the steering angle of the steering handle 8 to the controller 37 as time series data.

In the steering unit 14, the steering actuator 14b operates based on the steering angle data of the steering angle sensor 14c. The operation of the steering actuator 14b causes the propulsion unit 5 to rotate with respect to the bracket 29. By rotating the propulsion unit 5, the direction in which the thrust acts on the centerline C1 of the ship body 3 is changed.

As shown in FIG. 1, the pair of trim tabs 7 are provided on the ship body 3. For example, the pair of trim tabs 7 are attached to the rear portion of the ship body 3. Each of the pair of trim tabs 7 is swingably attached to the rear portion of the ship body 3. Specifically, the pair of trim tabs 7 are swingably attached to the rear portion of the ship body 3 on the left and right sides of the propulsion unit 5. Each of the pair of trim tabs 7 is attached to the rear portion of the ship body 3 so as to be swingable around a swing axis C3.

Figure 3:
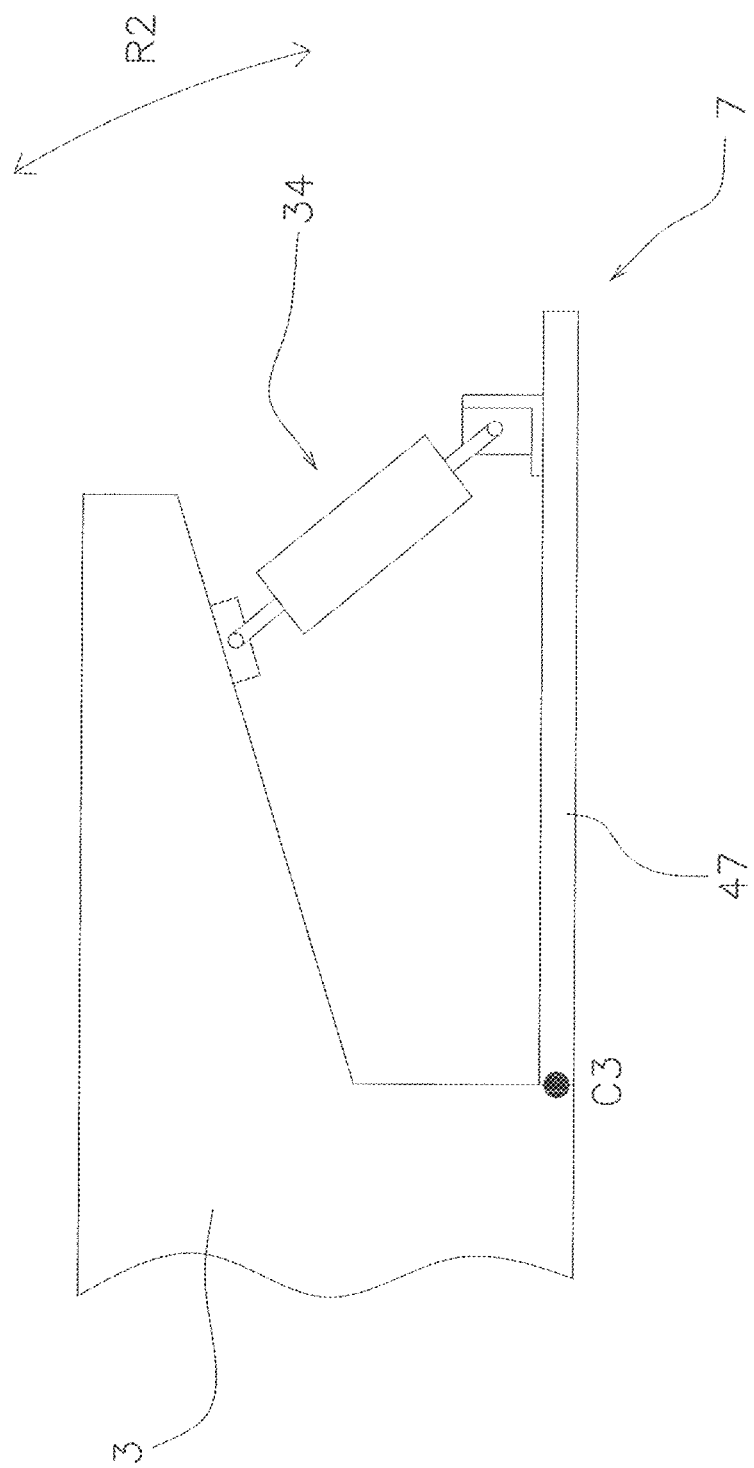
FIG. 3 is a side view of a trim tab attached to the ship body.

As shown in FIG. 3, each trim tab 7 includes a trim tab actuator 34 and a tab body 47. Each trim tab actuator 34 swings the tab body 47 with respect to the ship body 3. The trim tab actuators 34 are attached to the tab bodies 47 and the ship body 3 between the tab bodies 47 and the ship body 3, respectively.

Each tab body 47 is swingably attached to the rear portion of the ship body 3. For example, the base end portion of each tab body 47 is attached to the rear portion of the ship body 3 so as to swing around a swing axis C3. When each trim tab actuator 34 operates, each tab body 47 swings in the swing direction R2.

As shown in FIG. 3, the swing direction R2 is defined with the swing axis C3 as a reference. In the present preferred embodiment, the swing axis C3 extends in a direction perpendicular or substantially perpendicular to the centerline C1. For example, the swing axis C3 extends in the left-right direction. The swing axis C3 may extend obliquely so as to intersect the rotation axis C2 of the steering shaft 14a.

The ship 1 is equipped with a ship maneuvering system 31. As shown in FIG. 4, the ship maneuvering system 31 includes the above-described propulsion unit 5, the trim tab 7, and a controller 37.

The ship maneuvering system 31 further includes an attitude sensor 33 (an example of a second detector) and a ship body position sensor 35 (an example of a first detector). The ship maneuvering system 31 further includes a steering angle sensor 14c. Since the configuration of the steering angle sensor 14c is the same as the above-mentioned steering angle sensor, the description thereof will be omitted here.

Each trim tab 7 includes the trim tab actuator 34 and the tab body 47, as described above. Each trim tab actuator 34 is controlled by the controller 37. For example, the controller 37 outputs a control signal to each trim tab actuator 34. Each trim tab actuator 34 operates based on this control signal. The operation of each trim tab actuator 34 causes each tab body 47 to swing. Each trim tab actuator 34 may be a hydraulic actuator or an electric actuator.

The attitude sensor 33 is used to detect the traveling state of the ship 1. For example, the attitude sensor 33 is used to detect the attitude of the ship 1. The attitude sensor 33 is also used to detect the traveling direction of the ship 1. The attitude sensor 33 is attached to the ship body 3. The attitude sensor 33 includes an acceleration sensor 33a and a gyro sensor 33b.

The acceleration sensor 33a detects first attitude data indicating the attitude of the ship 1. The first attitude data is used to cause the controller 37 to determine the attitude of the ship 1. For example, the first attitude data includes a roll angle (an example of roll data) around the roll axis and a pitch angle (an example of pitch data) around the pitch axis.

The acceleration sensor 33a outputs the roll angle and the pitch angle to the controller 37. The roll angle and the pitch angle are recorded in the memory 37b as time series data. The controller 37 may acquire the acceleration data from the acceleration sensor 33a and calculate the roll angle and the pitch angle using the acceleration data.

The gyro sensor 33b detects the second attitude data to detect the traveling direction of the ship 1. The second attitude data is used to cause the controller 37 to determine the traveling direction of the ship 1. For example, the second attitude data includes a yaw rate (an example of yaw data) around the yaw axis. The gyro sensor 33b outputs the yaw rate to the controller 37. The yaw rate is recorded in the memory 37b as time series data. The yaw rate is the yaw rotation angular velocity.

The attitude sensor 33 may include only the gyro sensor 33b. In this case, the attitude data detected by the gyro sensor 33b includes the roll rate, the pitch rate, and the yaw rate. In this case, the controller 37 calculates the roll angle and the pitch angle by integrating each of the roll rate and the pitch rate. The roll angle and the pitch angle are used as the first attitude data. The yaw rate is used as the second attitude data described above.

The ship body position sensor 35 detects position data indicating the position of the ship 1. The ship body position sensor 35 is attached to the ship body 3. For example, the ship body position sensor 35 includes a GPS receiving unit. The ship body position sensor 35 receives the position data from GPS satellites. The ship body position sensor 35 outputs the position data to the controller 37. The position data is recorded in the memory 37b as time series data. GPS is an abbreviation for Global Positioning System.

The ship body position sensor 35 may calculate ship speed data indicating ship speed of the ship 1 based on the position data. In this case, the ship body position sensor 35 outputs the ship speed data to the controller 37. The ship speed data is recorded in the memory 37b as time series data.

The controller 37 includes a processor 37a and a memory 37b. For example, the processor 37a includes a CPU (Central Processing Unit). The processor 37a executes a process to control each device and each sensor according to programs recorded in the memory 37b. For example, the processor 37a executes the processes to control each trim tab actuator 34 based on the program recorded in the memory 37b. In the following, the description regarding "the processes executed by the controller 37" may be interpreted as "the processes executed by the processor 37a".

The controller 37 includes a main controller that controls the entire ship 1 and one or more sub-controllers that control the steering angle and the like. In this case, for example, the main controller controls the trim tab actuator 34. The steering angle sensor 14c is connected to the sub controller. The steering angle data of the steering angle sensor 14c is output to the main controller via the sub controller.

The memory 37b includes a volatile memory such as a RAM. The memory 37b includes a non-volatile memory such as a ROM. The memory 37b records programs and data to control each device and each sensor. For example, the memory 37b stores the programs and data to control each trim tab actuator 34.

The controller 37 may include an auxiliary storage such as a hard disk and/or a SSD. Further, an external storage (not illustrated) such as the hard disk and/or the SSD (not illustrated) may be connected to the controller 37.

The memory 37b records the steering angle data of the steering angle sensor 14c. For example, the memory 37b records the steering angle data of the steering angle sensor 14c as time series data.

The memory 37b records the position data of the ship body position sensor 35. For example, the memory 37b records the position data of the ship body position sensor 35 as time series data.

The memory 37b records the operation amount of the trim tab 7. For example, the operating amount of the trim tab 7 is used to determine the operating state of the trim tab 7. The memory 37b records time series data of the operation amount of the trim tab 7.

The operation amount of the trim tab 7 includes the operation amount of each trim tab actuator 34. The operation amount of the trim tab 7 includes positional relation data indicating the positional relationship between the pair of trim tabs 7. The positional relationship data includes an angle of one of the pair of trim tabs 7 with respect to the other one of the pair of trim tabs 7.

The memory 37b records a steering-angle setting table (an example of relationship information) indicating a relationship between the operation amount (the positional relation data) of the trim tab 7 and the steering angle of the propulsion unit 5.

The steering-angle setting table is used to set the steering angle of the propulsion unit 5 based on the operation amount (the positional relation data) of the trim tab 7. The steering-angle setting table defines a correction amount of the steering angle corresponding to the operation amount (the positional relation data) of the trim tab 7. The steering-angle angle setting table is preferably different according to the ship speed data. In other words, the steering-angle setting tables are preferably recorded in the memory 37b and the steering-angle setting table corresponding to the ship speed data is selected.

The memory 37b records the attitude data of the attitude sensor 33. For example, the memory 37b records the attitude data of the attitude sensor 33 as time series data.

The memory 37b records a predetermined value used in the following process of the ship maneuvering system 31. The predetermined value includes the first to fifth predetermined values.

The first predetermined value and the second predetermined value are used when the traveling direction of the ship 1 is determined. The third predetermined value is used when the attitude change of the ship 1 is determined. The first predetermined value, the second predetermined value, and the third predetermined value are used as threshold values.

For example, the first predetermined value is set to a predetermined value (≈0). The second predetermined value is set to a predetermined value (≠0). The third predetermined value is set to a predetermined value (≠0).

In order to consider the error, the first predetermined range may be used as the threshold value instead of the first predetermined value. The first predetermined range includes zero (0). Instead of the second predetermined value, the second predetermined range may be used as the threshold value. The second predetermined range does not include zero (0).

The fourth predetermined value and the fifth predetermined value are used to correct the change of the traveling direction of the ship 1 due to the operation of the trim tab 7. For example, the fourth predetermined value is used as a target value of a first variation amount YS1 (described below) when the traveling direction of the ship 1 is a straight direction. The fifth predetermined value is used as a target value of a second variation amount YS2 (described below) when the traveling direction of the ship 1 is a turning direction.

For example, the fourth predetermined value and the fifth predetermined value are set to predetermined value (≈0). In order to consider the error, the third predetermined range and the fourth predetermined range may be used as the threshold values instead of the fourth predetermined value and the fifth predetermined value. The third predetermined range and the fourth predetermined range include zero (0).

The memory 37b records the first table data indicating the relationship between the roll angle and the operation amount of the trim tab 7 (the operation amount of the trim tab actuator 34). The memory 37b may record a function to calculate the operation amount of the trim tab 7 (the operation amount of the trim tab actuator 34) with respect to the roll angle.

The memory 37b records second table data indicating the relationship between the pitch angle and the operation amount of the trim tab 7 (the operation amount of the trim tab actuator 34). The memory 37b may record a function to calculate the operation amount of the trim tab 7 (the operation amount of the trim tab actuator 34) with respect to the pitch angle.

The controller 37 calculates the ship speed data indicating the ship speed of the ship 1 based on the position data of the ship body position sensor 35. Specifically, the controller 37 calculates the ship speed data at predetermined time intervals based on the time series data of the position data. The time series data of the ship speed data is recorded in the memory 37b.

The controller 37 determines the steering angle before the trim tab 7 is operated or the steering angle when the trim tab 7 is operated as the first steering angle (an example of a second steering angle in claims). For example, the controller 37 acquires the steering angle data before the trim tab 7 is operated or the steering angle data when the trim tab 7 is operated. The controller 37 determines the steering angle corresponding to this steering angle data as the first steering angle. Thus, the controller 37 operates the steering actuator 14b to set the steering angle of the propulsion unit 5 to the first steering angle.

The controller 37 determines the traveling direction of the ship 1. For example, the controller 37 determines the traveling direction of the ship 1 based on the second attitude data.

Specifically, the controller 37 determines whether the traveling direction of the ship 1 is the straight direction based on the yaw rate.

The controller 37 calculates the integrated value of the yaw rate YA based on the time series data of the yaw rate. Thus, the controller 37 determines a ship body angle around the yaw axis. The controller 37 determines the traveling direction of the ship 1 based on the ship body angle around the yaw axis.

The controller 37 determines the attitude change of the ship 1. For example, the controller 37 determines the attitude change of the ship 1 based on the first attitude data.

Specifically, the controller 37 determines the attitude change of the ship 1 based on at least one of the roll angle and the pitch angle.

The controller 37 determines the ship body angle around the roll axis based on the roll angle. Specifically, the controller 37 determines the ship body angle around the roll axis based on the time series data of the roll angle. The controller 37 determines the attitude of the ship 1 around the roll axis based on the ship body angle around the roll axis.

The controller 37 determines the ship body angle around the pitch axis based on the pitch angle. Specifically, the controller 37 determines the ship body angle around the pitch axis based on the time series data of the pitch angle. The controller 37 determines the attitude of the ship 1 around the pitch axis based on the ship body angle around the pitch axis.

The controller 37 operates the trim tab 7. For example, the controller 37 operates the trim tab 7 based on the first attitude data, for example, at least one of the roll angle and the pitch angle.

In this case, the controller 37 outputs a tab start signal (an example of the first tab signal) to operate the trim tab 7. Specifically, the controller 37 outputs the tab start signal to the trim tab actuator 34. Thus, the trim tab actuator 34 operates, and the trim tab 7 also operates by the operation of the trim tab actuator 34.

The controller 37 stops the trim tab 7. For example, the controller 37 outputs a tab stop signal (an example of a second tab signal) to stop the operation of the trim tab 7. Specifically, the controller 37 outputs the tab stop signal to the trim tab actuator 34. Thus, the operation of the trim tab actuator 34 is stopped, and the trim tab 7 also stops by stopping the trim tab actuator 34.

The controller 37 corrects the attitude of the ship 1 by operating the trim tab 7. For example, the controller 37 corrects the attitude of the ship 1 by operating each trim tab 7 based on the first attitude data.

Specifically, the controller 37 operates each trim tab 7 based on at least one of the roll angle and the pitch angle. Thus, the attitude of the ship 1 is changed around at least one of the roll axis and the pitch axis.

More specifically, the controller 37 operates the tab body 47 by operating the trim tab 7 actuator based on at least one of the roll angle and the pitch angle. The attitude of the ship 1 is changed around at least one of the roll axis and the pitch axis by operating the trim tab actuator 34.

The controller 37 outputs a first steering start signal based on the output timing of the tab start signal. For example, the controller 37 outputs the first steering start signal between the output timing of the tab start signal and when the tab stop signal is output. The output timing of the tab start signal includes when the tab start signal is output, before the tab start signal is output based on when the tab start signal output, and after the tab start signal is output based on when the tab start signal output.

"Before the tab start signal is output" corresponds to "a time earlier than the time when the tab start signal is output by a predetermined time (for example, about 10 ms)". "After the tab start signal is output" corresponds to "a time delayed from the time when the tab start signal is output by a predetermined time (for example, about 10 ms).

In the present preferred embodiment, the controller 37 outputs the first steering start signal to the steering actuator 14b between the time when the tab start signal is output and the time when the tab stop signal is output. Thus, the steering actuator 14b operates and the propulsion unit 5 is steered.

The controller 37 corrects a change of the traveling direction of the ship 1 due to the operation of the trim tab 7 by turning the propulsion unit 5. For example, the controller 37 corrects the change of the traveling direction of the ship 1 due to the operation of the trim tab 7 by turning the propulsion unit 5 based on the operation amount of the trim tab 7. Specifically, the controller 37 corrects the change of the traveling direction of the ship 1 due to the operation of the trim tab 7 by turning the propulsion unit 5 based on the steering-angle setting table.

More specifically, when the trim tab 7 operates while the steering angle of the propulsion unit 5 is set to the first steering angle, the controller 37 acquires the current ship speed data. The controller 37 acquires the steering-angle setting table corresponding to the current ship speed data from the memory 37b. The controller 37 sets the steering angle of the propulsion unit 5 to the second steering angle or the third steering angle (an example of a first steering angle in claims) based on the steering-angle setting table corresponding to the current ship speed data. The second steering angle or the third steering angle is the steering angle after the trim tab 7 is operated. The second steering angle or the third steering angle is different from the first steering angle.

Thus, the change of the traveling direction of the ship 1 due to the operation of the trim tab 7 is corrected by turning the propulsion unit 5. In other words, the change of the traveling direction of the ship 1 due to the operation of the trim tab 7 is reduced.

The controller 37 outputs a second steering start signal after the tab stop signal is output. Thus, the steering actuator 14b operates and the propulsion unit 5 steers.

The controller 37 sets the steering angle of the propulsion unit 5 to the fourth steering angle or the fifth steering angle (an example of the third steering angle) based on a variation amount of the integrated value of the second attitude data (yaw rate) and a variation amount of the second attitude data (yaw rate), in a state in which the steering angle of the propulsion unit 5 is set to the second steering angle or the third steering angle.

The fourth steering angle or the fifth steering angle is a steering angle after the trim tab 7 is stopped. The fourth steering angle or the fifth steering angle is different from the second steering angle or the third steering angle.

The controller 37 determines the variation amount of yaw based on the integrated value of the first yaw rate before the operation of the trim tab 7 and the integrated value of the second yaw rate after the operation of the trim tab 7. Further, the controller 37 determines the variation amount of the yaw rate based on the first yaw rate before the operation of the trim tab 7 and the second yaw rate after the operation of the trim tab 7. The first yaw rate and the second yaw rate are included in the time series data of the yaw rate.

For example, the first yaw rate is a yaw rate when the ship 1 is traveling at the second steering angle or the third steering angle. The second yaw rate is a yaw rate after the controller 37 outputs a control signal to restart the operation of the trim tab actuator 34.

The controller 37 calculates the integrated value of the first yaw rate and the integrated value of the second yaw rate based on a predetermined time before the operation of the trim tab 7. The controller 37 calculates the difference between the integrated value of the second yaw rate and the integrated value of the first yaw rate to calculate a difference amount (a first variation amount YS1 of the yaw) of the integrated value of the yaw rate.

The controller 37 may calculate the first variation amount YS1 of the yaw by continuously calculating the integrated value of the second yaw rate at predetermined time intervals based on the time when the operation of the trim tab 7 starts. The controller 37 calculates the difference between the second yaw rate and the first yaw rate to calculate the yaw rate difference amount (the first variation amount YS1 of the yaw rate). The first variation amount YS1 is an absolute value.

The first variation amount YS1 is a variation amount which is used when the traveling direction of the ship 1 is adjusted to the straight direction. Here, the first variation amount YS1 of "the yaw" is the difference amount of the integrated value of the yaw rate when the traveling direction of the ship 1 is adjusted to the straight direction. Further, the first variation amount YS1 of "the yaw rate" is the difference amount of the yaw rate when the traveling direction of the ship 1 is adjusted to the straight direction.

Further, the controller 37 sets the first yaw rate as the target yaw rate. Here, the controller 37 records the first yaw rate as the target yaw rate in the memory 37b. In this case, the controller 37 calculates the difference amount of the yaw rate (the second variation amount YS2 of the yaw rate) based on the second yaw rate and the target yaw rate (the first yaw rate). For example, the controller 37 calculates the second variation amount YS2 of the yaw rate by calculating the difference amount between the second yaw rate and the target yaw rate. The second variation amount YS2 is an absolute value.

The second variation amount YS2 is a variation amount which is used when the traveling direction of the ship 1 is adjusted to the turning direction. Here, the second variation amount YS2 of the "yaw rate" is the difference amount of the yaw rate when the traveling direction of the ship 1 is adjusted to the turning direction.

The controller 37 sets the rotation direction R1 of the propulsion unit 5 based on the time series data of the yaw rate. For example, the controller 37 determines whether the traveling direction of the ship 1 has changed clockwise or counterclockwise based on the time-series data of the yaw rate. The controller 37 sets the rotation direction R1 of the propulsion unit 5 in a direction that cancels the change of the traveling direction of the ship 1.

The controller 37 sets the steering angle of the propulsion unit 5 to the fourth steering angle based on the first variation amount YS1. For example, the controller 37 operates the steering actuator 14b so that the first variation amount YS1 decreases. Specifically, the controller 37 operates the steering actuator 14b so that the first variation amount YS1 becomes the fourth predetermined value. The steering angle of the propulsion unit 5 is set to the fourth steering angle by the operation of the steering actuator 14b.

The controller 37 sets the steering angle of the propulsion unit 5 to the fifth steering angle based on the second variation amount YS2. For example, the controller 37 operates the steering actuator 14b so that the second variation amount YS2 decreases. Specifically, the controller 37 actuates the steering actuator 14b so that the second variation amount YS2 becomes the fifth predetermined value. The steering angle of the propulsion unit 5 is set to the fifth steering angle by the operation of the steering actuator 14b.

FIGS. 5A to 5D are flowcharts showing processes performed by the ship maneuvering system 31.

When the ship 1 starts traveling, the controller 37 starts monitoring the operating state of the ship 1 (S1). For example, the controller 37 monitors the attitude state of the ship 1, the operating state of the trim tab 7, and the traveling state of the ship 1. The traveling state of the ship 1 includes the traveling direction of the ship 1.

Here, the controller 37 acquires the first attitude data (a roll angle RA and a pitch angle PA) and the second attitude data (the yaw rate YA). The controller 37 monitors the attitude state of the ship 1 and the traveling state of the ship 1 based on the time series data of the first and second attitude data. Also, the controller 37 determines the operating state of the trim tab 7 based on the control signal output to the trim tab actuator 34.

The controller 37 determines the steering-angle setting table (S2). Specifically, the controller 37 determines the ship speed data corresponding to the current ship speed. The controller 37 acquires the steering-angle setting table corresponding to this ship speed data from the memory 37b. Thus, the controller 37 determines the steering-angle setting table corresponding to the ship speed data.

The controller 37 determines the current steering angle as the first steering angle (S3). Thus, the controller 37 operates the steering actuator 14b so that the steering angle of the propulsion unit 5 becomes the first steering angle. In this state, the ship 1 travels in a state in which the steering angle of the propulsion unit 5 is set to the first steering angle. The traveling direction of the ship 1 is set by the first steering angle.

The controller 37 determines whether the traveling direction of the ship 1 is the straight direction based on the time series data of the yaw rate YA (the second attitude data) (S4). The case in which the yaw rate YA is substantially zero (0) corresponds to the case in which the traveling direction of the ship 1 is the straight direction.

When the current yaw rate YA is the first predetermined value ($\mp 0$), the controller 37 determines that the traveling direction of the ship 1 is the straight direction (Yes in S4). Note that the first predetermined range may be used as the threshold value instead of the first predetermined value. In this case, when the yaw rate YA is within the first predetermined range ($|YA|<A1$), the controller 37 determines that the traveling direction of the ship 1 is the straight direction. Here, the error range is defined by A1. A1 is a positive number. The error range includes zero (0).

On the other hand, when the current yaw rate YA is the second predetermined value ($\neq 0$), the controller 37 determines that the traveling direction of the ship 1 is the turning direction (No in S4). The second predetermined value is a value excluding the first predetermined value.

Note that the second predetermined range may be used as the threshold value instead of the second predetermined value. The second predetermined range is a range excluding the first predetermined value ($\approx 0$) or the first predetermined range. In this case, when the yaw rate YA is within the second predetermined range ($|YA| \geq A1$), the controller 37 determines that the traveling direction of the ship 1 is the turning direction.

When the attitude of the ship 1 changes due to the movement of a person on the boat, the influence of cross wind against the ship 1, and the like during the ship traveling in the above state (Yes in S4 or No in S4), the controller performs the following process so as to return the attitude of the ship 1 to the normal attitude.

The controller 37 determines whether or not the attitude of the ship 1 needs to be changed around the roll axis and/or the pitch axis based on the roll angle RA and the pitch angle PA (first attitude data) (S5, S6).

For example, the controller 37 determines that the attitude of the ship 1 needs to be changed (Yes in S5 and S6), when the roll angle RA (the ship body angle around the roll axis) and/or the pitch angle PA (the ship body angle around the pitch axis) is larger than the third predetermined value A2 ($\neq 0$) ($|RA|>A2$, $|PA|>A2$). A2 is a positive number.

In this case, the controller 37 starts the operation of the trim tab 7. For example, the controller 37 starts the operation of at least one of the pair of trim tabs 7 (S7, S8).

For example, the controller 37 starts the operation of at least one of the pair of tab bodies 47 via the trim tab actuator 34 so that the roll angle RA and/or the pitch angle PA becomes substantially zero.

Specifically, the controller 37 refers to the first table data and sets the operation amount of the trim tab 7 (the operation amount of the trim tab actuator 34). Further, the controller 37 refers to the second table data and sets the operation amount of the trim tab 7 (the operation amount of the trim tab actuator 34). In this state, the controller 37 outputs the tab start signal and starts the operation of at least one of the pair of tab bodies 47 via the trim tab actuator 34.

Thus, by operating at least one of the pair of tab bodies 47, the attitude of the ship 1 is corrected to a substantially horizontal attitude.

On the other hand, when the roll angle RA (the ship body angle around the roll axis) and/or the pitch angle PA (the ship body angle around the pitch axis) substantially matches zero (0) ($RA \approx 0$, $PA \approx 0$), the controller 37 determines that the attitude of the ship 1 doesn't needs to be changed around the roll axis and/or the pitch axis (No in S5 and S6). In this case, the controller 37 executes the process of a step 4 (S4).

The controller 37 starts recognition of the current operation amount of the trim tab 7 based on the time when the tab start signal is output, for example, when the operation of the trim tab 7 is started. The current operation amount of the trim tab 7 is recorded in the memory 37b as time series data. Correction of the traveling direction of the ship (before operation of trim tab is stopped)

Figure 6A:
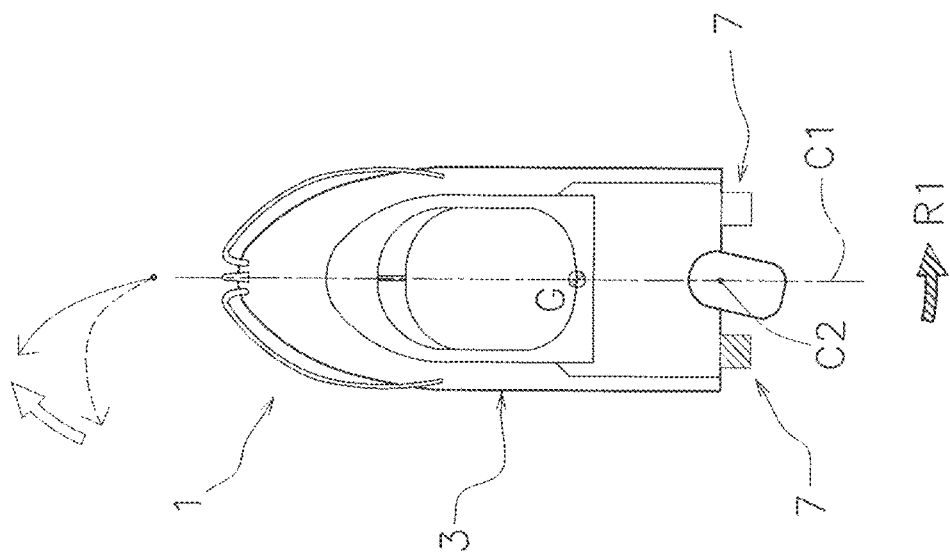
FIG. 6A is a schematic diagram for explaining a correction of an advancing direction when the ship moves straight.
Figure 6B:
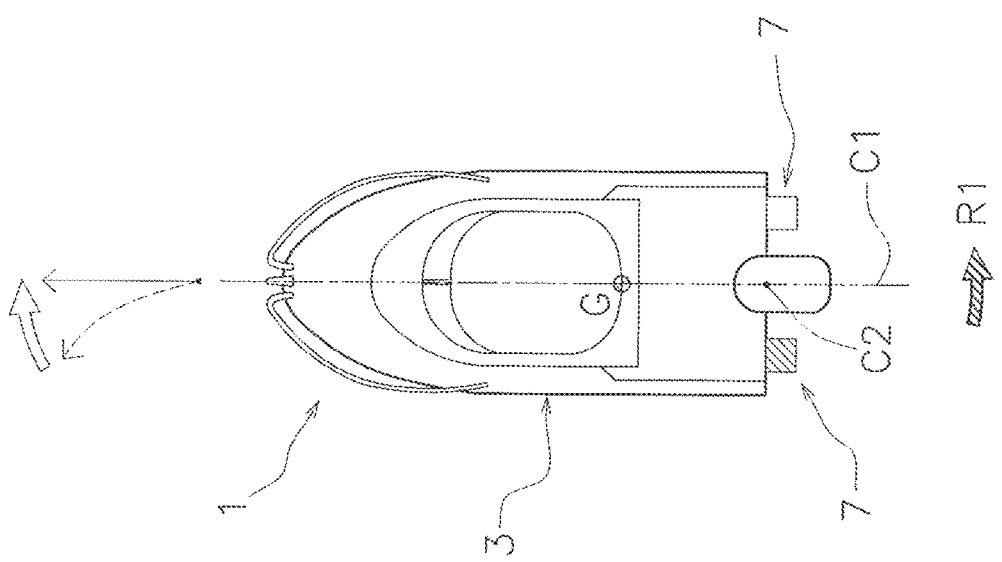
FIG. 6B is a schematic diagram for explaining the correction of the advancing direction when the ship turns on a circle.

When the trim tab 7 operates as described above and the traveling direction of the ship 1 changes due to the operation of the trim tab 7, the controller 37 corrects the traveling direction of the ship 1, as shown in FIGS. 6A and 6B. Here, the controller 37 sets the steering angle of the propulsion unit 5 to the second steering angle or the third steering angle based on the steering-angle setting table (S9, S10).

Specifically, the controller 37 refers to the steering-angle setting table and acquires the correction amount of the steering angle. The controller 37 sets the steering angle of the propulsion unit 5 to the second steering angle or the third steering angle with the correction amount of the steering angle.

For example, the controller 37 sets the rotation direction R1 of the propulsion unit 5 (see the hatched arrows in FIGS. 6A and 6B) based on the time-series data of the yaw rate. The controller 37 acquires the correction amount of the steering angle based on the operation amount (the positional relation data) of the trim tab 7. The controller 37 sets the steering angle of the propulsion unit 5 to the second steering angle or the third steering angle based on the correction amount of the steering angle.

Specifically, when the traveling direction of the ship 1 is the straight direction (see FIG. 6A), the controller 37 sets the steering angle with respect to the current operation amount of the trim tab 7 (the positional relation data) as the second steering angle based on the steering-angle setting table for a straight traveling.

More specifically, the controller 37 determines the current operation amount (the positional relation data) of the trim tab 7. The controller 37 acquires the correction amount of the steering angle corresponding to the current operation amount (the positional relation data) of the trim tab 7 by referring to the steering-angle setting table for straight traveling. The controller 37 sets the steering angle of the propulsion unit 5 as the second steering angle based on the correction amount of the steering angle (S9).

When the traveling direction of the ship 1 is the turning direction (see FIG. 6B), the controller 37 sets the steering angle with respect to the current operation amount (the positional relation data) of the trim tab 7 as the third steering angle based on the steering-angle setting table for turning.

Specifically, the controller 37 determines the current operation amount (the positional relation data) of the trim tab 7. The controller 37 sets the steering angle corresponding to the current operation amount (the positional relation data) of the trim tab 7 as the third steering angle by referring to the steering-angle setting table for turning (S10).

The controller 37 outputs the first steering start signal. For example, the controller 37 outputs the first steering start signal to the steering actuator 14b so that the steering angle of the propulsion unit 5 becomes the second steering angle or the third steering angle. The controller 37 outputs the first steering start signal to the steering actuator 14b between the time when the tab start signal is output and the time when the tab stop signal is output.

Thus, the rotation of the propulsion unit 5 is started as indicated by the hatched arrows in FIGS. 6A and 6B. Thus, the traveling direction of the ship 1 is corrected as indicated by the white blank arrow in FIGS. 6A and 6B by rotating the propulsion unit 5.

The controller 37 determines whether or not the steering angle of the propulsion unit 5 has reached the second steering angle or the third steering angle (S11, S12). Here, when it is determined that the steering angle of the propulsion unit 5 has reached the second steering angle or the third steering angle (Yes in S11 and S12), the controller 37 executes the process of step 13 (S13). On the other hand, when it is determined that the steering angle of the propulsion unit 5 has not reached the second steering angle or the third steering angle (No in S11 and S12), the controller 37 continues the process of the steps 11 and 12 (S11 and S12).

The controller 37 determines whether the operation of the trim tab 7 has stopped (S13). For example, the controller 37 determines whether or not the tab stop signal is output. Here, when the tab stop signal is not output (No in S13), for example, when the trim tab 7 is in operation, the controller 37 continues the above-described rotation control of the propulsion unit 5. On the other hand, when the tab stop signal is output (Yes in S13), for example, when the trim tab 7 is stopped, the controller 37 executes the process of step 14 (S14).

Correction of the traveling direction of the ship (after the operation of the trim tab 7 is stopped).

After the operation of the trim tab 7 is stopped, the controller 37 adjusts the traveling direction of the ship 1. For example, the traveling direction of the ship 1 corrected before the operation of the trim tab 7 is stopped is adjusted after the operation of the trim tab 7 is stopped as follows.

The controller 37 determines whether or not the traveling direction of the ship 1 needs to be adjusted (S14). For example, the controller 37 determines whether or not the traveling direction of the ship 1 needs to be adjusted based on the time-series data of the yaw rate (the second attitude data).

Figure 7A:
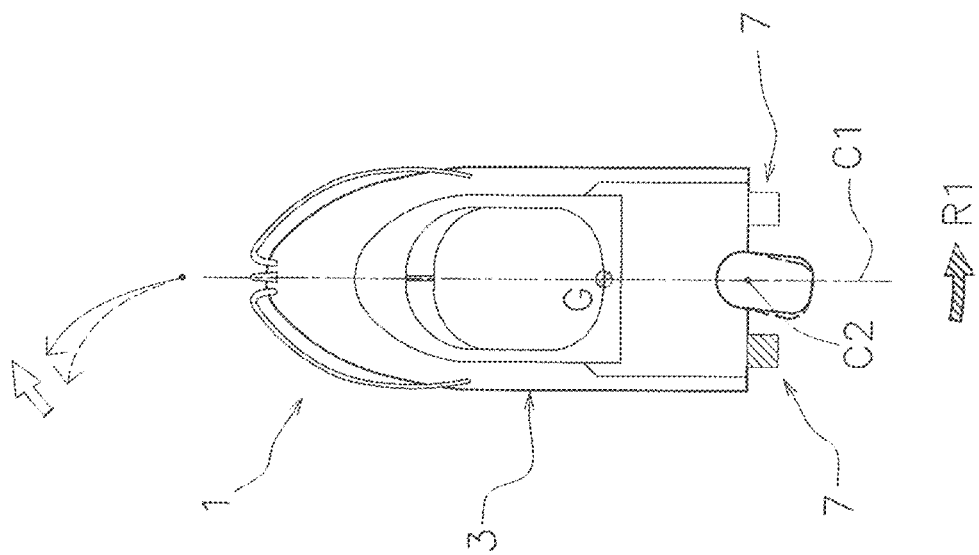
FIG. 7A is a schematic diagram for explaining an adjustment of an advancing direction when the ship moves straight.
Figure 7B:
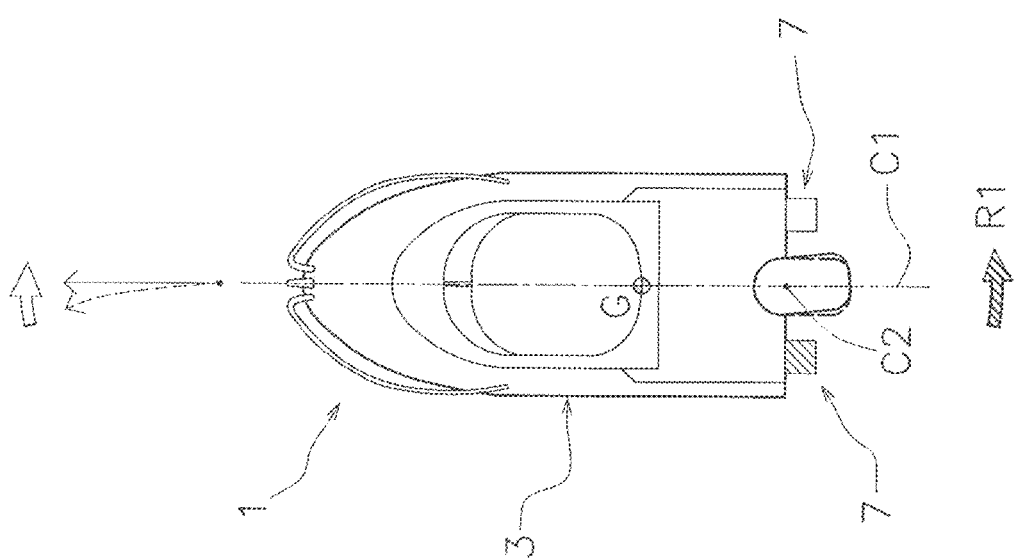
FIG. 7B is a schematic diagram for explaining the adjustment of the advancing direction when the ship turns on a circle.

In FIGS. 7A and 7B, the target traveling direction of the ship 1 is indicated by a solid arrow. The current traveling direction of the ship 1 is indicated by a dashed arrow. The trim tab 7 that operates is hatched. The direction in which the traveling direction of the ship 1 is adjusted is indicated by the white blank arrow. The rotation direction R1 of the propulsion unit 5 to adjust the traveling direction of the ship 1 is indicated by the hatched arrow.

When the current traveling direction of the ship 1 is adjusted to the straight direction (for example, in the case of FIG. 7A).

In this case, the traveling direction of the ship 1 is corrected by using the variation amount of the integrated value of the yaw rate YA or the variation amount of the yaw rate YA.

In case that the variation amount of the integrated value of the yaw rate YA is used The controller 37 calculates the variation amount of the integrated value of the yaw rate YA, for example, the difference amount of the integrated value of the yaw rate YA (the first variation amount YS1 of the yaw) based on the integrated value of the first yaw rate before the operation of the trim tab 7 and the integrated value of the second yaw rate after the operation of the trim tab 7. This difference amount is an absolute value.

For example, the controller 37 sets the integrated value of the yaw rate from a predetermined first time before the operation of the trim tab 7 to the start of the operation of the trim tab 7 as the integrated value of the first yaw rate. The controller 37 sets the integrated value of the yaw rate YA from the above first time to a predetermined second time after the operation of the trim tab 7 as the integrated value of the second yaw rate. The controller 37 uses the difference amount between the integrated value of the second yaw rate and the integrated value of the first yaw rate as the first variation amount YS1 of the yaw.

Further, the controller 37 may calculate the first variation amount YS1 of the yaw as follows. The controller 37 continuously calculates the integrated value of the yaw rate YA at a predetermined time interval based on the start time of the operation of the trim tab 7. Thus, the difference amount of the integrated value of the yaw rate YA (the first variation amount YS1 of yaw) is calculated. This difference amount is an absolute value.

When the current traveling direction of the ship 1 is adjusted to the straight direction, the controller 37 determines whether the first variation amount YS1 of the yaw matches the fourth predetermined value ($\approx 0$) (S14).

Here, when the first variation amount YS1 of the yaw matches the fourth predetermined value ($\approx 0$) (Yes in S14), the controller 37 determines that the traveling direction of the ship 1 is maintained in the straight direction, or the adjustment of the traveling direction of the ship 1 is not required or desired. In this case, the controller 37 executes the process of step 3 (S3).

On the other hand, when the first variation amount YS1 of the yaw does not match the fourth predetermined value ($\approx 0$) (No in S14), the controller 37 determines that the ship body angle of the ship 1 in the straight traveling has still changed around the yaw axis. In this case, the controller 37 determines that the adjustment of the traveling direction of the ship 1 needs.

In case that the variation amount of the yaw rate is used

The controller 37 calculates the variation amount of the yaw rate YA, for example, a difference amount of the yaw rate YA, based on the first yaw rate before the operation of the trim tab 7 and the second yaw rate after the operation of the trim tab 7. The difference amount is an absolute value. The controller 37 uses the difference amount of the yaw rate YA as the first variation amount YS1 of the yaw rate.

For example, the controller 37 sets the average value of the yaw rates from the predetermined first time before the operation of the trim tab 7 to the start of the operation of the trim tab 7 as the first yaw rate. When the traveling direction of the ship 1 is the straight direction, the first yaw rate is substantially zero. The first yaw rate may be the yaw rate when the operation of the trim tab 7 starts.

The controller 37 continuously calculates the second yaw rate at a predetermined time interval based on the start time of the operation of the trim tab 7. The controller 37 calculates the first variation amount YS1 of the yaw rate by calculating the difference between the second yaw rate and the first yaw rate. In other words, the controller 37 continuously calculates the first variation amount YS1 of the yaw rate (the difference amount between the yaw rates YA before and after the tab operation) at predetermined time intervals.

The first yaw rate, the second yaw rate, and the first variation amount YS1 of the yaw rate are recorded in the memory 37b.

When the current traveling direction of the ship 1 is adjusted to the straight direction, the controller 37 determines whether the first variation amount YS1 of the yaw rate matches the fourth predetermined value (≈0).

Here, when the first variation amount YS1 of the yaw rate matches the fourth predetermined value (≈0) (Yes in S14), the controller 37 determines that the traveling direction of the ship 1 is maintained in the straight direction, or the adjustment of the traveling direction of the ship 1 not required or desired. In this case, the controller 37 executes the process of step 3 (S3).

On the other hand, when the first variation amount YS1 of the yaw rate does not match the fourth predetermined value (≈0) (No in S14), the controller 37 determines that the ship body angle of the ship 1 in the straight traveling has still changed around the yaw axis. In this case, the controller 37 determines that the adjustment of the traveling direction of the ship 1 is needed.

When the adjustment of the traveling direction of the ship 1 is performed (see the dashed arrow in FIG. 7A), the controller 37 outputs the second steering start signal to the propulsion unit 5. Thus, the controller 37 operates the steering actuator 14b again and sets the steering angle of the propulsion unit 5 to the fourth steering angle (S15).

For example, the controller 37 sets the rotation direction R1 of the propulsion unit 5 (see the hatched arrow in FIG. 7A) based on the time series data of the yaw rate YA. The controller 37 sets the steering angle of the propulsion unit 5 to the fourth steering angle so that the first variation amount YS1 becomes the fourth predetermined value (≈0). As a result, the propulsion unit 5 rotates as indicated by the hatched arrow in FIG. 7A, and the traveling direction of the ship 1 is corrected as indicated by the white blank arrow in FIG. 7A.

Note that the third predetermined range may be used as the threshold value instead of the fourth predetermined value. In this case, when the first variation amount YS1 is within the third predetermined range (|YS1|<A3), the controller 37 determines that the traveling direction of the ship 1 is maintained in the current straight direction, or the change of the traveling direction of the ship 1 has been adjusted. Here, the error range is defined by A3. A3 is a positive number. The error range includes zero (0).

When the first variation amount YS1 is out of the third predetermined range (|YS1|≥A3), the controller 37 determines that the traveling direction of the ship 1 (the current straight direction) has still changed. In this case, the controller 37 sets the steering angle of the propulsion unit 5 to the fourth steering angle so that the first variation amount YS1 enters within the third predetermined range. The traveling direction of the ship 1 is adjusted by controlling the steering angle of the propulsion unit 5 in this manner.

When the current traveling direction of the ship 1 is adjusted to the turning direction (for example, in the case of FIG. 7B)

In this case, the traveling direction of the ship 1 is adjusted based on the time series data of the yaw rate YA. The controller 37 calculates the variation amount of the yaw rate YA, for example, the difference amount of the yaw rate YA, based on the second yaw rate and the target yaw rate (the first yaw rate). This difference amount is an absolute value. The controller 37 uses the difference amount of the yaw rate YA as the second variation amount YS2 of the yaw rate YA.

For example, the controller 37 calculates the difference amount of the yaw rate YA (the second variation amount YS2 of the yaw rate) by calculating the difference between the second yaw rate and the target yaw rate. In other words, the controller 37 continuously calculates the second variation amount YS2 of the yaw rate (the difference amount of the yaw rate YA) at a predetermined time interval based on the start time of the operation of the trim tab 7. The second variation amount YS2 of the yaw rate is recorded in the memory 37b.

When the current traveling direction of the ship 1 is adjusted to the turning direction, the controller 37 determines whether the second variation amount YS2 matches the fifth predetermined value (≈0) (S14).

Here, when the second variation amount YS2 matches the fifth predetermined value (=0) (Yes in S14), the controller 37 determines that the traveling direction of the ship 1 is maintained in the turning direction, or the adjustment of the traveling direction of the ship 1 is not required or desired. In this case, the controller 37 executes the process of step 3 (S3).

On the other hand, when the second variation amount YS2 does not match the fifth predetermined value (≈0) (No in S14), the controller 37 determines that the ship body angle of the ship 1 during turning has still changed around the yaw axis. In this case, the controller 37 determines that the adjustment of the traveling direction of the ship 1 is needed or desired.

When the adjustment of the traveling direction of the ship 1 is performed (see the dashed arrow in FIG. 7B), the controller 37 outputs the second steering start signal to the propulsion unit 5. Thus, the controller 37 operates the steering actuator 14b again and sets the steering angle of the propulsion unit 5 to the fourth steering angle (S15).

For example, the controller 37 sets the rotation direction R1 of the propulsion unit 5 (see the hatched arrow in FIG. 7B) based on the time series data of the yaw rate YA. The controller 37 sets the steering angle of the propulsion unit 5 to the fifth steering angle so that the second variation amount YS2 becomes the fifth predetermined value (≈0). As a result, the propulsion unit 5 rotates as indicated by the hatched arrow in FIG. 7B, and the traveling direction of the ship 1 is corrected as indicated by the white blank arrow in FIG. 7B.

Note that the fourth predetermined range may be used as the threshold value instead of the fifth predetermined value. In this case, when the second variation amount YS2 is within the fourth predetermined range (|YS2|<A4), the controller 37 determines that the traveling direction of the ship 1 is maintained in the turning direction, or the change of the traveling direction of the ship 1 has been adjusted. Here, the error range is defined by A4. A4 is a positive number. The error range includes zero (0).

When the second variation amount YS2 is out of the fourth predetermined range (|YS21|≥A4), the controller 37 determines that the traveling direction of the ship 1 (the current turning direction) has still changed. In this case, the controller 37 sets the steering angle of the propulsion unit 5 to the fifth steering angle so that the second variation amount YS2 enters within the fourth predetermined range. The traveling direction of the ship 1 is adjusted by controlling the steering angle of the propulsion unit 5 in this manner.

After the traveling direction of the ship 1 is corrected and adjusted as described above, the controller 37 determines whether the steering angle of the propulsion unit 5 has reached the fourth steering angle or the fifth steering angle (S16). Here, when it is determined that the steering angle of the propulsion unit 5 has reached the fourth steering angle or the fifth steering angle (Yes in S16), the controller 37 executes the process of step 14 (S14). On the other hand, when it is determined that the steering angle of the propulsion unit 5 has not reached the fourth steering angle or the fifth steering angle (No in S16), the controller 37 continues the process of step 16 (S16).

In the above-described ship maneuvering system 31, when the trim tab 7 is operated in a state in which the steering angle of the propulsion unit 5 is set to the first steering angle, the change of the traveling state of the ship 1 due to the operation of the trim tab 7 is corrected by setting the steering angle of the propulsion unit 5 to the second steering angle or the third steering angle.

Thus, the change of the traveling state of the ship body 3 due to the operation of the trim tab 7 is significantly reduced or prevented.

Further, after the trim tab 7 is operated, the traveling state of the ship 1 is adjusted by setting the steering angle of the propulsion unit 5 to the fourth steering angle or the fifth steering angle. Thus, the change of the traveling state of the ship body 3 due to the operation of the trim tab 7 is reliably reduced or prevented.

The ship maneuvering system 31 may be configured according to a variation of the above-described preferred embodiments as follows.

In the above-described preferred embodiments, an example in which the attitude sensor 33 is an example of a second detector is explained. However, the change of the traveling direction of the ship 1 may be determined by the ship body position sensor 35, for example, a GPS receiving unit.

In this case, the controller 37 acquires the position data from the ship body position sensor 35. The controller 37 calculates the direction data indicating the traveling direction of the ship 1 based on the position data of the ship body position sensor 35. The controller 37 sets the steering angle of the propulsion unit 5 to the above-described fourth steering angle or the fifth steering angle based on the direction data.

Specifically, the controller 37 calculates the direction data based on the time series data of the position data. The controller 37 determines whether the adjustment of the traveling direction of the ship 1 is needed or desired based on the time-series data of the direction data (S14). Here, when the adjustment of the traveling direction of the ship 1 is needed or desired (Yes in S14), the steering angle of the propulsion unit 5 is set to the fourth steering angle or the fifth steering angle.

Other Preferred Embodiments

The ship maneuvering system 31 may be configured as follows.

In FIGS. 6A, 6B, 7A and 7B of the above-described preferred embodiments, a case that one of the pair of trim tabs 7 (the left trim tab 7) operates is described in order to facilitate the description of the ship maneuvering system 31. In the ship maneuvering system 31, the other of the pair of trim tabs 7 (the right trim tab 7) may be operated. Further, the pair of trim tabs 7 (the left and right trim tabs 7) may be operated simultaneously.

In the above-described preferred embodiments, an example in which the propulsion unit 5 is an outboard motor is described. However, the propulsion unit 5 may be an inboard motor. Further, the propulsion unit 5 may be an electric outboard motor.

In the above-described preferred embodiments, an example in which the crankshaft 21 extends in the vertical direction is described. However, the extending direction of the crankshaft 21 may be another direction. For example, the crankshaft 21 may extend in a direction intersecting the vertical direction or may extend in a direction perpendicular to the vertical direction.

In the above-described preferred embodiments, an example in which the trim tab 7 is the trim adjuster is described. However, the trim adjuster may be an interceptor. In this case, the controller 37 controls the actuator of the interceptor. Thus, the interceptor projects from the lower surface of the ship body in the water or stored above the lower surface of the ship body in the water.

According to preferred embodiments of the present invention, the ship maneuvering system and the ship maneuvering method are able to significantly reduce or prevent the change of the traveling state of the ship due to the operation of the trim adjuster.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A ship maneuvering system comprising:
a propulsion unit to steer a ship body;
a trim adjuster disposed on the ship body; and
a controller configured or programmed to correct a change of a traveling state of the ship body due to an operation of the trim adjuster.

2. A ship maneuvering system comprising:
a propulsion unit to steer a ship body;
a trim adjuster disposed on the ship body; and
a controller configured or programmed to correct a change of a traveling state of the ship body due to an operation of the trim adjuster; wherein
the controller is configured or programmed to set a steering angle of the propulsion unit to a first steering angle based on relationship information indicating a relationship between an operation amount of the trim adjuster and the steering angle of the propulsion unit when the trim adjuster is operated in a state in which the steering angle of the propulsion unit is set to a second steering angle different from the first steering angle.

3. The ship maneuvering system according to claim 2, wherein
the controller is configured or programmed to output a first tab signal to operate the trim adjuster and to output a first steering start signal based on an output timing of the first tab signal.

4. The ship maneuvering system according to claim 3, wherein
the controller is configured or programmed to output a second tab signal to stop the operation of the trim adjuster and to output the first steering start signal between the output timing of the first tab signal and when the second tab signal is output.

5. The ship maneuvering system according to claim 2, further comprising:
a first detector to detect the traveling state of the ship body; wherein
the first detector outputs position data; and
the controller is configured or programmed to calculate ship speed data based on the position data and to determine the relationship information corresponding to the ship speed data.

6. The ship maneuvering system according to claim 2, further comprising:
a second detector to detect the traveling state of the ship body; wherein
the second detector outputs yaw data around a yaw axis; and
the controller is configured or programmed to set the steering angle of the propulsion unit to a third steering angle according to a variation amount of the yaw data, the third steering angle being different from the first steering angle.

7. The ship maneuvering system according to claim 6, wherein
the controller is configured or programmed to output a second tab signal to stop the operation of the trim adjuster and to output a second steering start signal after the second tab signal is output.

8. The ship maneuvering system according to claim 1, further comprising:
a second detector to detect the traveling state of the ship body; wherein
the second detector outputs at least one of roll data around a roll axis and pitch data around a pitch axis; and
the controller is configured or programmed to operate the trim adjuster based on at least one of the roll data and the pitch data.

9. A ship maneuvering method executed by a controller to maneuver a ship including a propulsion unit to steer a ship body and a trim adjuster disposed on the ship body, the ship maneuvering method comprising:
correcting a change of a traveling state of the ship body due to operation of the trim adjuster by steering the propulsion unit.

10. The ship maneuvering method according to claim 9, further comprising:
setting a steering angle of the propulsion unit to a first steering angle based on relationship information indicating a relationship between an operation amount of the trim adjuster and the steering angle of the propulsion unit, when the trim adjuster is operated in a state in which the steering angle of the propulsion unit is set to a second steering angle different from the first steering angle.

11. The ship maneuvering method according to claim 10, further comprising:
outputting a first tab signal to operate the trim adjuster; and
outputting a first steering start signal based on an output timing of the first tab signal.

12. The ship maneuvering method according to claim 11, further comprising:
outputting a second tab signal to stop the operation of the trim adjuster; and
outputting the first steering start signal between the output timing of the first tab signal and when the second tab signal is output.

13. The ship maneuvering method according to claim 10, wherein the ship includes a first detector to detect the traveling state of the ship body, and the ship maneuvering method further comprises:
acquiring position data from the first detector;
calculating ship speed data based on the position data; and
determining the relationship information corresponding to the ship speed data.

14. The ship maneuvering method according to claim 10, wherein the ship includes a second detector to detect the traveling state of the ship body, and the ship maneuvering method further comprises:
acquiring yaw data around a yaw axis from the second detector; and
setting the steering angle of the propulsion unit to a third steering angle according to a variation amount of the yaw data, the third steering angle being different from the first steering angle.

15. The ship maneuvering method according to claim 14, further comprising:
outputting a second tab signal to stop the operation of the trim adjuster; and
outputting a second steering start signal after the second tab signal is output.

16. The ship maneuvering method according to claim 9, wherein the ship includes a second detector to detect the traveling state of the ship body, and the ship maneuvering method further comprises:
acquiring at least one of roll data around a roll axis and pitch data around a pitch axis from the second detector; and
operating the trim adjuster based on at least one of the roll data and the pitch data.

17. The ship maneuvering system according to claim 1, wherein the trim adjuster operates independently of the propulsion unit.

18. The ship maneuvering system according to claim 1, wherein the trim adjuster includes a trim tab.

* * * * *